Dec. 3, 1957  A. C. J. WARD  2,814,856
METHOD OF MANUFACTURING PLAIN BEARINGS AND
APPARATUS FOR MAKING SUCH BEARINGS
Filed Jan. 13, 1955  3 Sheets-Sheet 1
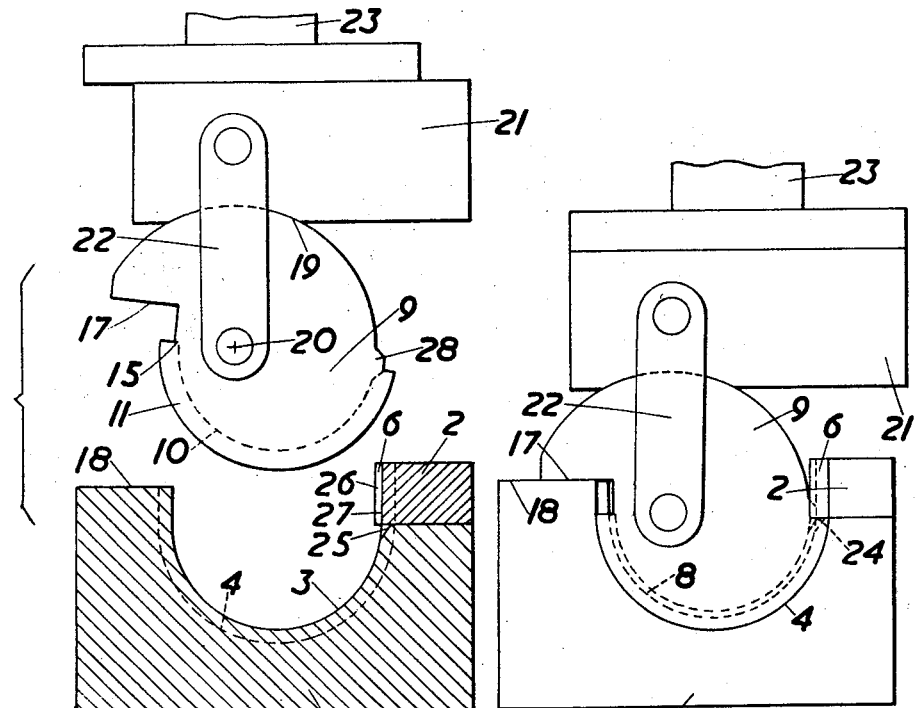
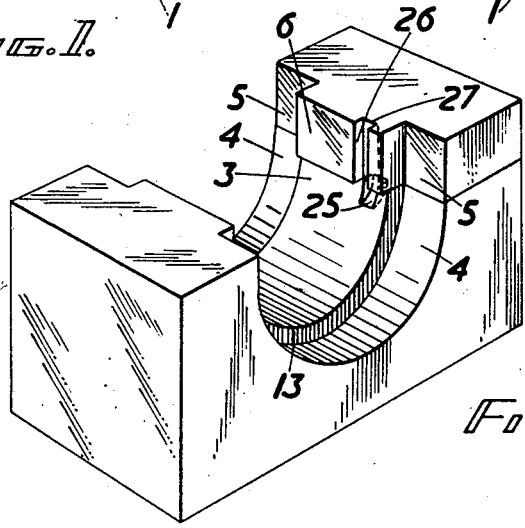
INVENTOR
AUSTIN C. J. WARD
by Pierce, Scheffler & Parker
ATTORNEYS

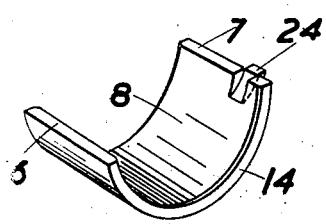
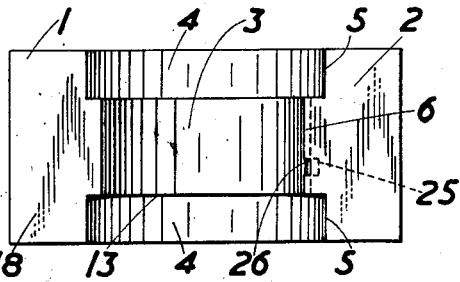
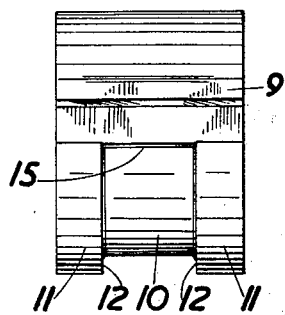
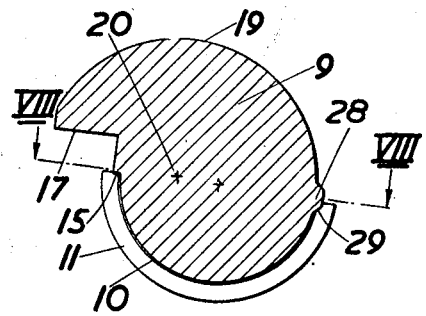
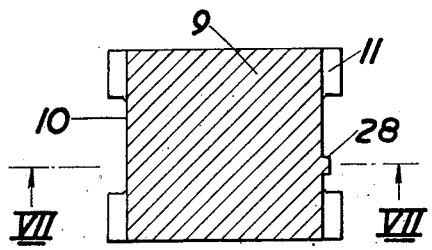
INVENTOR
AUSTIN C. J. WARD
by Pierce, Scheffler & Parker
ATTORNEYS INVENTOR
AUSTIN C. J. WARD
by Pierce, Scheffler & Parker
ATTORNEYS //United States Patent Office 2,814,856
Patented Dec. 3, 1957

2,814,856

METHOD OF MANUFACTURING PLAIN BEARINGS AND APPARATUS FOR MAKING SUCH BEARINGS

Austin Charles James Ward, Wembley, England, assignor to The Glacier Metal Company Limited, Wembley, England, a British company Application January 13, 1955, Serial No. 481,637

Claims priority, application Great Britain January 19, 1954

12 Claims. (Cl. 29—149.5)

This invention relates to the manufacture of part cylindrical plain bearings, which for convenience herein will be assumed to be semicylindrical since this will normally be the case and will for convenience be called half liners, the half liners being formed from approximately rectangular flat blanks by pressing such blanks into the required part cylindrical form. The blanks may consist either of a single metal, combination of metals or alloy or of two or more superimposed layers of different metals, combinations of metals or alloys bonded to one another.

It is known in the manufacture of such half liners to press the blanks between closed dies in such a manner as to upset and coin press them with a view to obtaining a substantially predetermined outer contour requiring no subsequent machining and an approximately predetermined circumferential length requiring only the removal of a small amount of metal from the parallel edges of the half liners as by broaching, to provide the required substantially exact circumferential length.

One method of coin pressing the blanks as described for example in the specification of British Patent No. 409,289, consists in pressing the blank after it has been bent into approximately semi-cylindrical form between inner and outer dies of which the inner die has shoulders which bear upon the parallel edges of the approximately semi-cylindrical blank and thus upset the blank while forcing its outer circumferential surface against the inner surface of the outer die.

The axial length of the half liners so produced by known methods is indeterminate and the ends of the half liners have therefore to be faced to provide the required finished axial length and normally chamfered internally and externally where, as is usual, such chamfering is required. Moreover the thickness of half liners produced in this way is indeterminate.

In the specification of the present applicant's British patent application No. 4,608 of 1952 a method of pressing an approximately semi-cylindrical blank has been described in which the blank is initially of somewhat smaller wall thickness than that required in the finished half liner and has appropriate upsetting pressure applied to one or more of its edges in a closed die chamber so that a plastic flow takes place causing it to increase in thickness and conform closely to the inner and outer circumferential surfaces of the die chamber, thus determining substantially exactly the thickness and the contours of the inner and outer circumferential surfaces of the half liner after pressing.

With this method, as with the previously known method referred to, the blank tends to increase in thickness first adjacent to the point or points where the upsetting pressure is being applied, with the result that, in the method described in the specification of British application No. 4,608 of 1952, very high pressures are required to cause the required plastic flow in the parts of the blank more remote from the point or points of application of the upsetting pressure since the local thickening tends to cause the thickened parts of the blank to grip the surfaces of the dies between which they are confined. Difficulty may therefore in some cases be experienced in causing the surfaces of the blank to conform over its whole area to the surfaces of the inner and outer dies at the end of the pressing operation.

An object of the present invention is to provide an improved method of making half liners of the kind referred to and apparatus for carrying out that method, in which the required plastic flow during the pressing operation will be facilitated while the axial length and either the thickness or the circumferential length of the half liner at the end of the pressing operation can be substantially exactly determined.

The method of making a plain bearing of the kind referred to according to the present invention includes the steps of pressing a blank between inner and outer dies, at least one of the dies being formed or provided with an abutment parallel to the axis of the part-cylindrical surfaces of the dies (and hence to the rotary axis of the bearing) to engage one of the parallel straight edge surfaces of the blank (hereinafter referred to for convenience as the joints faces), while the other die is provided with end walls to engage the arcuate end surfaces of the blank, by first moving the dies towards one another and then rotating the dies relatively to one another through a small angle about the rotary axis of the part-cylindrical surfaces of the dies, in a direction such as to move points on the surface of the second die and of the end walls provided thereon, which are in contact with the blank, towards the abutment on the first die, and simultaneously limiting the axial length of the bearing by means of the end walls of the second die.

Thus, apparatus for forming a bearing half liner of the kind referred to according to the present invention comprises inner and outer dies having cooperating part-cylindrical die surfaces, one of the dies being formed or provided with an abutment parallel to the axis of its part-cylindrical surface to engage one of the parallel joint faces of the bearing, while the other die is provided with end walls to engage the arcuate end surfaces of the blank, and means for moving the dies towards one another and for then rotating the dies relatively to one another through a small angle about the rotary axis of the part-cylindrical die surfaces in a direction such as to move points on the surface of the second die, and of the end walls provided thereon, which are in contact with the blank, towards the abutment on the first die.

The second die which carries the end walls may be provided also with an abutment parallel to the axis of its part-cylindrical die surface, to engage the opposite joint face of the bearing. In one preferred form the apparatus may include means for limiting the rotational movement of the dies relative to one another, for example by mating surfaces formed thereon, so as to determine or limit the circumferential length of the bearing.

Alternatively the apparatus may include means for limiting the linear bodily movement of the dies towards one another, so as to determine or limit the final thickness of the bearing, and in this case the two dies are preferably provided with cooperating contacting part-cylindrical surfaces formed coaxial with the part-cylindrical die surfaces, which act to limit the movement of the dies towards one another without preventing relative rotational movement and thus to determine or limit the final thickness of the bearing. With this arrangement, therefore, the thickness and axial length of the half liners after pressing are substantially exactly determined while the circumferential length depends on the volume of the blank.

In a method of making plain bearings according to the invention therefore the relative rotational or bodily movement between the dies may be limited by stop surfaces so as to determine respectively either the circumferential length or the thickness of the half liners substantially exactly while the other of these two dimensions depends on the volume of the blank.

According to a further feature of the invention the outer die may be provided adjacent to its abutment with a groove while the inner die has formed thereon at a position corresponding to the groove, a projection which, during the downward movement of the inner die during the pressing operation presses out a part of the blank into the groove to form a locating lug on the edge portion of the half liner, of a type generally known, for locating the half liner in its housing when in use.

The operating mechanism for moving the dies towards one another may vary but in one arrangement the outer die is fixed while the inner die is actuated by a power operated pressing member exerting a thrust through a point displaced from the axis of the die surfaces.

The invention also lies in a bearing half liner when manufactured by a method or apparatus as specified above.

Alternatively the apparatus may include means for moving this support and the other die relatively towards and away from one another and means for positively rotating the first die relative to the support.

Preferably the means for causing the relative rotation of the dies is brought into operation automatically when the contact pressure between the two dies reaches a predetermined value.

In one preferred form one of the dies is fixed while the other die is connected to a ram or the equivalent through a collapsible support arranged to collapse at a predetermined load and the apparatus includes means for rotating this die through the required small angle when the support collapses.

The collapsible support preferably comprises a first link pivotally attached to the ram or equivalent and a second link rigidly attached to one of the dies, the two links being pivotally attached at their free ends to a plunger lying in a cylinder which is rigidly secured to the ram, and the apparatus includes means for controlling the fluid flow into or out of the cylinder.

The invention may be performed in various different ways but one specific embodiment will now be described by way of example with reference to the accompanying drawings in which:

Figure 1 is a diagrammatic side elevation showing the inner and outer dies spaced apart before the pressing operation commences.

Figure 2 is a similar view showing the dies in their final positions at the end of a pressing operation.

Figure 3 is a perspective view on an enlarged scale of the outer die.

Figure 4 is a plan view of the outer die.

Figure 5 is a perspective view of the half liner after being pressed.

Figure 6 is an end view of the inner die.

Figure 7 is a sectional side view through the inner die.

Figure 8 is a cross sectional view on the line VIII—VIII in Figure 7, and

Figure 9:
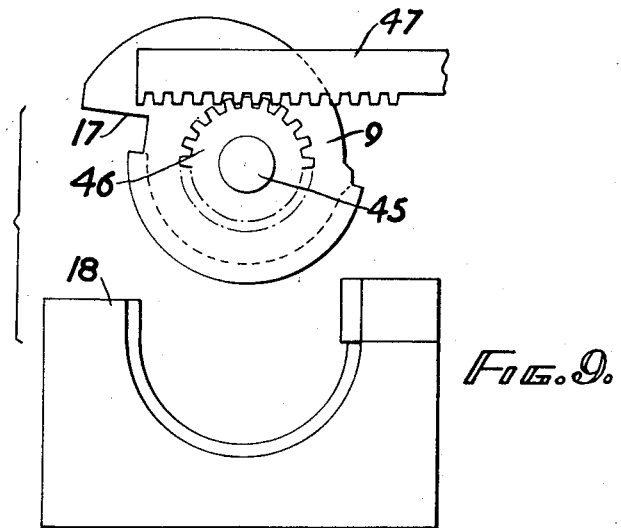
Figures 9 and 10 are diagrammatic side elevations of modified forms of the invention.

The outer die, which in the first example is stationary and is fixed to the base of the machine, comprises a main part 1 and a subsidiary part 2 which forms one of the abutments referred to. The main part 1 is provided with a semi-cylindrical female die surface 3, which shapes the outer curved surface of the half liner, and two coaxial part-cylindrical control surfaces 4, of somewhat greater radius, lying on either side of the surface 3. The subsidiary part 2 is rigidly connected to the main part 1 and conforms generally to the shape of the adjacent portion thereof, having plain vertical surfaces 5 which form continuations of the surfaces 4. The mid-part 6 of this subsidiary portion, whose axial length is equal to that of the die surface 3, projects inwards for a distance equal to the thickness of the half liner, and acts as an abutment to engage one of the joint faces 7 of the half liner 8 (see Figure 5).

The inner die 9 is formed on its lower side with a semi-cylindrical male die surface 10, of an axial length equal to that of the die surface 3 on the outer die. On either side of the die surface 10 are formed semi-cylindrical flanges 11, co-axial with the surface 10, these flanges being arranged to lie in the annular recess formed by the control surfaces 4 on the outer die. The adjacent inner surfaces 12 of the flanges 11 constitute end walls and engage the annular surfaces 13 on the outer die between the curved surfaces 3 and 4, and also engage the curved end surfaces 14 of the half liner 8 to control its axial length.

At the peripheral end of the surface 10 remote from the abutment 6 on the outer die is formed a step 15 of a depth equal to the thickness of the half liner, this step acting as an abutment to engage the second joint face 16 of the liner. The inner die 9 is also formed with a plain surface 17 which cooperates with a plain surface 18 on the outer die to limit the downward and rotational movement of the inner die relative thereto, as shown in Figure 2.

The upper part of the inner die 9 is formed with a part cylindrical surface 19 centered on an axis 20 which is displaced from the axis of the die surface 10 in a direction away from the abutment 6 on the outer die. The surface 19 cooperates with a corresponding concave part cylindrical surface on a thrust block 21, so as to permit the inner die to rotate relative to the block, and the inner die is held in contact with the block by a pair of arms 22 which are pivotally attached to the inner die on trunnions co-axial with the axis 19. The thrust block 21 is connected to a ram 23 in such a way as to permit the block to slide horizontally relative to the ram.

The inner and outer dies are formed also to provide an out-turned locating lug 24 on the half liner (see Figure 5). To this end the part cylindrical die surface 3 on the outer die is provided with a recess 25 immediately below the abutment 6, and the abutment 6 is formed with a vertical slot 26 of an axial length equal to that of the lug 24, the vertical back face 27 of the slot being substantially continuous with the die surface 3. The inner die 9 is formed with a corresponding projection 28 on its die surface 10, this projection having a lower inclined surface 29 which acts during the pressing operation to force the lug 24 into the recess 25 in the outer die. The slot 25 in the outer die, permits the projection 28 to pass downwards into engagement with the lug 24, and also permits the projection to move upwards as the inner die 9 rotates.

In operation a roughly semi-cylindrical pressing 8 is placed in position on the die surface 3 of the lower die and the ram 23 is then caused to move downwards carrying the inner die 9 with it. After the flanges 11 contact the surface 4 on the outer die further downward bodily movement of the inner die is prevented, but since the thrust exerted on the inner die by the thrust block 21 passes through a plane displaced from the axis of the die surface, the inner die tends to rotate about the axis of the surface 10 and towards the abutment 6. The inner die rotates through a small angle, for example between 3° and 5°. The pressing will tend to flow plastically and will tend to fill the whole available space between the dies. As it does so it is gripped by the abutments 6 and 15 and by the end walls 12 and the relative movement of 15 and 12 will help to cause the metal to conform to the desired shape.

During the initial downward movement of the inner die the projection 28 forces the lug 24 on the liner into the recess 25 in the outer die, and during the rotational movement the projection 28 moves upwards through the slot 26.

In this method, where the flanges 11 directly contact the control surfaces 4 on the outer die to control the thickness of the half liner, the peripheral length of the liner is not controlled and the rotational movement may be halted at any convenient moment.

In an alternative method of manufacture the flanges 11 may be slightly undersize so as not to contact the surface 4 directly, and in this case the rotational movement is continued after the die surfaces 3 and 10 have engaged the blank, by downward movement of the ram 23, until the mating surfaces 17 and 18 engage. In this position the step or abutment 15 is in fixed relationship with the abutment 6 and the peripheral length of the half liner is therefore controlled, though the thickness of the finished liner will depend upon the volume of metal present in the blank.

It will be understood that in both cases the axial length of the liner is controlled by the end walls 12 on the inner die engaging the surfaces 13 on the outer die, and the corresponding surfaces 14 of the liner.

If required the end walls 12 may be bevelled as shown in Figure 6 so as to produce a chamfered inner circumferential edge on the finished half liner.

In some cases a groove or grooves, arranged so as to constitute circumferential oil grooves in the bearing, may be machined or pressed into the blank before the coin pressing operation and in this case one or more corresponding circumferential ribs may be provided on the inner die to prevent metal flowing into such groove or grooves during the pressing operation and thus to maintain the desired shape thereof.

Figure 10:
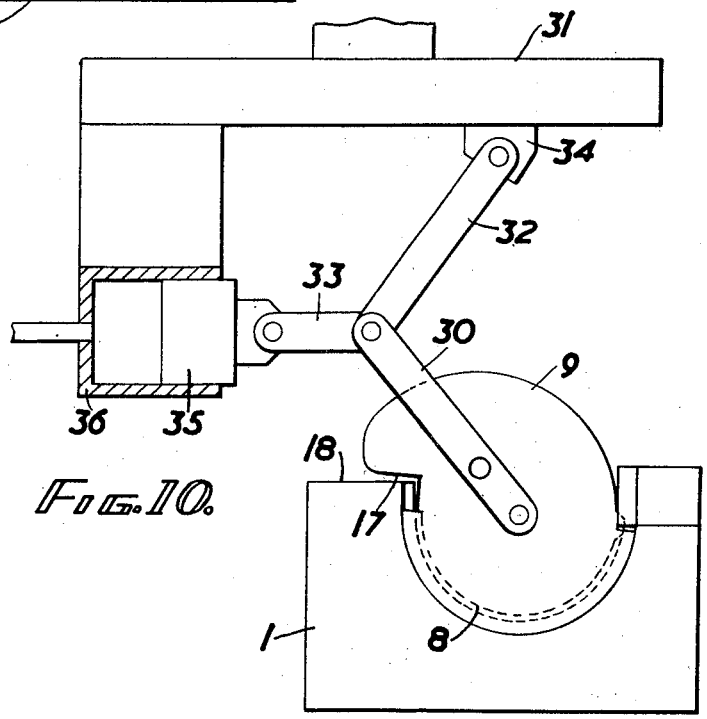

Two alternative methods of obtaining the desired relative movement of the dies are illustrated in Figures 9 and 10. In both cases the dies themselves are basically identical with the dies described in connection with the previous figures.

In the construction illustrated in Figure 9 the inner die 9 is secured to a shaft 45 which is carried in fixed bearings, and the apparatus includes means for causing positive rotation of this shaft and hence of the die 9. Thus in the example illustrated the shaft 45 is connected to a pinion 46 which meshes with a reciprocating rack 47 under the control of a ram or other equivalent device (not shown). One or other of the dies is arranged to be movable bodily towards the other, and in the present case the bearings of the shaft 45 are conveniently held fixed while the outer die 1 is connected to a ram, crank, cam or other mechanism by which it can be moved upwards towards the inner die 9. Alternatively the outer die 1 may be fixed, and the part which carries the bearings for the shaft 45 may be connected to a ram arranged to move the inner die bodily downwards towards the outer die.

In the operation of this form of the invention the dies are first caused to be moved bodily towards one another until they are correctly positioned, and the inner die is then positively rotated through the required small angle, or until the mating surfaces 17 and 18 limit further rotation.

In the further alternative illustrated in Figure 10 the outer die 1 is held fixed while the inner die 9 is secured to an arm 30 constituting part of a collapsible link system carried by a reciprocating ram 31. The remote end of the arm 30 is pivotally attached to the ends of a link 32 and connecting link 33. The other end of the link 32 is pivotally attached to a horizontally adjustable block 34 supported in guides on the lower face of the ram 31 and capable of being fixed in any desired horizontal position. The other end of the connecting link 33 is connected to a piston 35 lying in a hydraulic or pneumatic cylinder 36 rigidly secured to the ram 31. The flow of fluid to and from this cylinder is controlled by apparatus including a pressure relief valve (not shown) which opens when the pressure within the cylinder reaches a predetermined value.

In operation the fluid connection to the cylinder 36 is initially closed and the ram 31 is caused to move downwards. The link system 32, 33, 30 is thus rigid and the inner die 9 moves bodily towards the outer die 1. When the inner die 9 makes contact with the surface of the pressing 8 further downwards movement of the inner die 9 is prevented, and the pressure in the cylinder 36 rises until the relief valve opens, and the linkage system then collapses, the arm 30 pivoting about the axis of the die surfaces 3 and 10. The inner die 9 is thus caused to rotate, and at the same time the pressure in the cylinder 36 tends to maintain a downward pressure on the inner die towards the fixed outer die 1.

It will be seen that this arrangement enables the relative rotation between the dies to be effected automatically when the resistance to movement of the ram 31 reaches a predetermined value, that is to say at a predetermined contact pressure between the two dies 1 and 9. The lowest position of the die 9 in relation to the ram 31 can be controlled by varying the position of the adjusting block 34.

This arrangement also enables the inner die 9 to be conveniently and readily freed from the pressing 8 after the operation has been completed. For this purpose the cylinder 36 is connected to relief, while the ram 31 is still descending at the end of its travel and further downward movement of the ram 31 causes the inner die 9 to pivot about the rounded end of the face 17, so lifting the die surface away from the surface of the pressing 8.

It will be understood that in this arrangement also, as in the previously described example, the outer die may be moved towards the inner die, while the support for the inner die is held stationary.

What I claim as my invention and desire to secure by Letters Patent is:

1. Apparatus for forming a part-cylindrical bearing comprising inner and outer dies having cooperating part-cylindrical die surfaces, each of the dies being provided with an abutment parallel to the axis of the part-cylindrical die surfaces to engage the opposite parallel straight joint edges of the bearing, while one of the dies is provided with end walls to engage the arcuate end surfaces of the bearing, means operatively connected to said die having end walls for moving it relatively towards the other die and means operatively connected to said die having end walls for then rotating it relatively to the other die through a small angle about the rotary axis of the part-cylindrical die surfaces in a direction such as to move points on the surface of the die having said end walls, which are in contact with the bearing, towards the abutment on the other die.

2. Apparatus as claimed in claim 1 including stop means fixedly located relative to one of said dies and positioned to be contacted by a part of the other of said dies on relative rotational movement between said dies for limiting the rotational movement of the dies relative to one another, so as to determine the circumferential length of the finished bearing.

3. Apparatus as claimed in claim 1 including stop means fixedly located relative to one of said dies and positioned to be contacted by a part of the other of said dies for limiting the linear bodily movement of the dies relatively to one another so as to determine the final thickness of the bearing.

4. Apparatus as claimed in claim 3 in which the two dies are provided with cooperating contacting part-cylindrical guide surfaces formed coaxially with the part-cylindrical die surfaces, which act to limit the movement of the dies towards one another without preventing relatively rotational movement thereof.

5. Apparatus as claimed in claim 1 in which the outer die is provided with an abutment and is formed with a recess in its die surface adjacent the abutment, while the inner die is formed with a projection on its die surface corresponding to the recess, which projection, during the relative movement of the dies, presses out a part of the bearing into the recess to form a locating lug on the bearing adjacent the respective parallel straight edge surface thereof.

6. Apparatus as claimed in claim 1 in which the means for moving dies relative to one another comprises means for exerting a thrust on one die in a direction which is non-radial to the die surfaces.

7. Apparatus as claimed in claim 1 including means sensitive to the contact pressure between the two dies, and arranged to actuate the means for causing the relative rotation of the dies when the contact pressure reaches a predetermined value.

8. Apparatus as claimed in claim 7 in which one of the dies is mounted on a collapsible support arranged to collapse at a predetermined load, and including means for rotating this die through the required small angle when the support collapses.

9. Apparatus as claimed in claim 1 including a part which is movable relative to one of the dies, a collapsible support by which the other die is mounted on this part, the collapsible support comprising a first link pivotally attached to the part and a second link rigidly attached to the associated die, a cylinder rigidly secured to the part and a plunger lying within this cylinder, the two links being pivotally attached at their free ends to this plunger, and means for controlling the fluid pressure within the cylinder to allow the support to collapse at a predetermined contact load, thus rotating the second die through the required small angle as the support collapses.

10. A method of manufacturing a part cylindrical plain bearing including the steps of pressing a blank between inner and outer dies, each of the dies being formed or provided with an abutment parallel to the axis of the part-cylindrical surfaces of the dies to engage the opposite parallel straight edge surfaces of the blank while one die is provided with end walls to engage the arcuate end surfaces of the blank, by first moving the dies toward one another to coin press the part cylindrical surfaces of the blank and then rotating the dies relatively to one another through a small angle about the rotary axis of the part-cylindrical surfaces of the dies, in a direction such as to move points on the surface of the die having the end walls provided thereon, which are in contact with the blank, towards the abutment on the other die, thereby coin pressing the said parallel straight edge surfaces of the blank and simultaneously limiting the axial length of the bearing by means of the said end walls.

11. A method of manufacturing a plain bearing as claimed in claim 10 in which the movement of the dies towards one another is limited, so as to determine the thickness of the final bearing, by cooperating part cylindrical surfaces, which are formed coaxial with the part-cylindrical die surfaces.

12. A method of manufacturing a plain bearing as claimed in claim 10, in which the initial linear and subsequent rotary movement of the dies relative to one another is provided by exerting a thrust on at least one of the dies through a point which is eccentric to the axis of the part-cylindrical die surfaces, and non-radial to these surfaces.

References Cited in the file of this patent

UNITED STATES PATENTS

| | | |
|---|---|---|
| 1,744,030 | Chadwick | June 21, 1930 |
| 1,936,454 | Klocke | Nov. 21, 1933 |
| 1,938,570 | Abbott | Dec. 12, 1933 |
| 2,119,900 | Bate | June 7, 1938 |